3,308,119
SULFANILAMIDES
Markus Zimmermann, Riehen, near Basel, Switzerland, assignor to Geigy Chemical Corporation, Greenburgh, N.Y., a corporation of Delaware
No Drawing. Filed June 8, 1965, Ser. No. 462,387
Claims priority, application Switzerland, Oct. 31, 1961, 12,588/61
4 Claims. (Cl. 260—239.75)

This application is a continuation-in-part of our pending patent application Serial No. 234,251, filed on October 30, 1962, now abandoned.

The present invention concerns new sulfanilamides which have valuable chemotherapeutical properties as well as antibacterial compositions containing the said sulfanilamides as active ingredients.

It has been found that compounds of the general formula

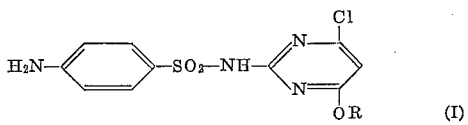

wherein R represents a lower alkyl radical, have excellent antibacterial activity. In the compounds of Formula I, R is, for example, methyl, ethyl, n-propyl or isopropyl, i.e., an alkyl radical having maximally 3 carbon atoms.

To produce the new compounds of Formula I, a salt, particularly an alkali metal salt, of a compound of the formula

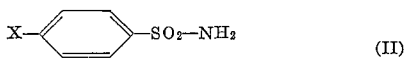

wherein X represents the amino group or a nitrogen-containing group which can be converted into the amino group, is reacted with a pyrimidine derivative of the general formulas

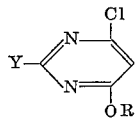

or

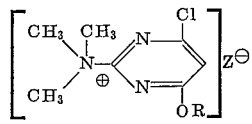

wherein

Y represents a lower alkylsulfonyl radical, in particular the methylsulfonyl radical, or a halogen atom, in particular a chlorine atom, and Z represents a pharmacologically acceptable monovalent anion, in particular a chlorine ion, or a normal equivalent of a polyvalent anion, and R has the meaning given above, and, if necessary, the group X is converted to the free amino group. The reactions are performed with heating in a suitable organic solvent such as dimethyl formamide, acetamide, N,N-dimethyl-acetamide, or dimethylsulfoxide.

As nitrogen-containing radicals which can be converted into the free amino group those are suitable in process for making the compounds according to the invention which can be converted to the amino group by hydrolysis namely of the acylamino radicals such as the acetamino radical, or lower carbalkoxyamino radicals, or substituted imino groups such as the benzylideneamino radical or the p-dimethylamino-benzylideneamino radical; also radicals which can be converted to the amino group by reduction, e.g., radicals containing the nitro group or substituted azo groups such as, e.g., the phenylazo or p-dimethylaminophenylazo radical; also e.g., the carbobenzyloxy radical or benzylideneamino radical. The hydrolysis of compounds containing a radical which can be hydrolysed into an amino group can be performed, e.g., in acid medium such as heating in dilute methanolic hydrochloric acid; hydrolysis of carboalkoxyamino compounds is also performed under mild alkaline conditions, e.g., by means of 1-normal to 2-normal sodium hydroxide solution at room temperature. The reduction of the groups mentioned above which can be reduced or split thereby can, in general, be performed catalytically, e.g., by means of hydrogen in the presence of Raney nickel in an inert organic solvent; but this can also be achieved by chemical processes such as the reduction of nitro groups and azo groups by means of iron in acetic acid or hydrochloric acid.

The starting materials of the general Formula III are obtained, for example, by reacting 2,4,6-trichloropyrimidine with one mol of an alkali metal alcoholate (III, Y=Cl), or by reacting 2,4-dichloro-6-methoxy-pyridimine with an alkali metal-alkylmercaptide followed by oxidation to the alkylsulfonyl compound of Formula III (Y=SO$_2$ alkyl), or by treating S-alkyl-thiobarbituric acid with an inorganic acid chloride, reacting the 2-alkylthio-4,6-dichloro-pyrimidine obtained with one mol of an alkali metal alcoholate followed by oxidation (III, Y=SO$_2$ alkyl).

The starting materials of the general Formula IV are obtained, for example, by reaction of 2,4-dichloro-6-alkoxy-pyrimidine in a suitable solvent, such as benzene, with one mol of trimethylamine.

Compounds of the general Formula I are also obtained by a modification of the above described process whereby a compound of the formula

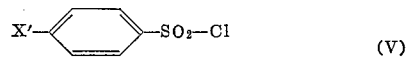

wherein

X' represents a nitrogen-containing group which can be converted into the amino group, is reacted with a substituted 2-aminopyrimidine of the formula

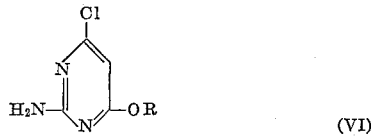

wherein R has the meaning given above, in the presence of an acid binding agent, and the group X' is subsequently converted to the free amino group.

The new sulfanilamide derivatives corresponding to Formula I are suitable for the preparation of medicaments for internal or external use, for the treatment of infections caused by gram-positive bacteria such as Staphylococci, Streptococci, Pneumococci, as well as by gram-negative bacteria such as *Salmonella typhi, Escherichia coli* and *Klebsiella pneumoniae*. They are distinguished from the known compounds in the art by that on oral administration, they quickly attain a high blood level and, in spite of this, remain for a long time in the organism and, in addition, both per se and in the form of their N-acetyl derivatives, they are very easily soluble in a physiological pH range of 6–8.

For administration, the novel compounds of Formula I are combined with suitable carriers to form, e.g., tablets, dragées, suppositories or syrups or, e.g., powders, or unit doses are filled into capsules. They may also be used in the form of their salts, e.g., as sodium, potassium, lithium, magnesium or calcium salts, or as salts with organic bases such as ethylamine, dimethylamine, diethylaminoethanol, morpholine, ethylenediamine, aminoethanol, diethylamine, diethanolamine or triethanolamine, which have a neutral to weakly alkaline reaction, some of which are water-soluble, for example, aqueous solutions may be used for injections.

Where "lower" is used in this specification in connection with an aliphatic radical, it means a radical with from not more than 4 carbon atoms.

The following non-limitative examples serve to further illustrate the production of the new compounds. The temperatures are in degrees centigrade.

*Example 1*

(a) 20.99 g. of 4,6-dichloro-2-methylthio-pyrimidine are dissolved in 135 ml. of anhydrous methanol and a solution of 2.5 g. of sodium in 30 ml. of anhydrous methanol is added dropwise at room temperature while stirring. The whole is stirred overnight at room temperature and then the solvent is distilled off in vacuo. The residue is extracted with ether and the ethereal solution is concentrated. 4-chloro-6-methoxy-2-methylthio-pyrimidine is obtained as crystals which melt at 39–41°.

(b) 13.2 g. of the above thioether are suspended in about 100 ml. of water, an excess of chlorine gas is bubbled through while cooling with ice and the suspension is then left to stand for 45 minutes. The precipitate is filtered off and crystallized from benzene/hexane, whereupon 4-chloro-6-methoxy-2-methylsulfonyl-pyrimidine is obtained which melts at 90–91°.

(c) 7.15 g. of the above sulfone are dissolved in 60 ml. of dimethyl formamide, 12.6 g. of sulfanilamide-sodium are added and the suspension is stirred overnight at room temperature. It is then heated for several hours at 100° and afterwards concentrated in vacuo. The residue is extracted with sodium carbonate solution, the extract is acidified and then extracted with ethyl acetate. The extract is dried, the solvent is evaporated off and the residue is rubbed with aqueous ethanol. The precipitate formed is recrystallized from acetone/hexane. The 4-chloro-6-methoxy-2-sulfanilamido-pyrimidine so obtained melts at 163–165°.

*Example 2*

The sulfanilamide sodium salt produced from 431 g. of sulfanilamide and 100 g. of sodium hydroxide in aqueous solution is thoroughly dried and then suspended in 700 ml. of dimethyl formamide. 179 g. of 2.4-dichloro-6-methoxy-pyrimidine are then added and the whole is stirred for 1 hour at room temperature, 2 hours at a bath temperature of 40° and finally for 14 hours at a bath temperature of 60°. The solvent is distilled off under high vacuum and the residue is dispersed in 900 ml. of water whereupon an oversaturated solution or a suspension is obtained. The pH of the aqueous dispersion is adjusted to 7–8 with Dry Ice (solid carbon dioxide), it is stirred for at least 1 hour while cooling with ice, and then excess sulfanilamide is filtered off. On acidifying the filtrate with about 230 ml. of dilute hydrochloric acid (1:1) to pH 4–5, the crude product separates out in a greasy form. The mother lye is decanted off from the crude product and the latter is dissolved in 500 ml. of hot ethanol with the addition of 2 g. of active charcoal. The solution is filtered and cooled. The 4-chloro-6-methoxy-2-sulfanilamido-pyrimidine precipitates in crystalline form and after recrystallizing once from ethanol and drying under high vacuum at 100°, it melts at 165–167°.

In an analogous manner, 4-chloro-6-isopropoxy-2-sulfanilamido-pyrimidine is obtained which, after crystallization from ethanol, melts at 231–232° with gas development, and 4-chloro-6-ethoxy-2-sulfanilamido-pyrimidine is obtained which is crystallized from ethanol. The latter first melts at 146° and after resolidification, it melts a second time at 169–170°.

*Example 3*

(a) 8.95 g. of 2,4-dichloro-6-methoxy-pyrimidine are dissolved while stirring in 50 ml. of anhydrous benzene and the solution is cooled in an ice bath. 30 ml. of a 10% solution of trimethylamine in anhydrous benzene is then slowly added dropwise while stirring vigorously. After stirring for 1 hour in an ice bath 50 ml. of absolute ether are added and the N-(4-chloro-6-methoxy-2-pyrimidinyl)-N,N,N-trimethyl-ammonium chloride is filtered off.

(b) 8 g. of the crude quaternary salt obtained are added in portions while stirring to an ice-cooled suspension of 13.2 g. of sulfanilamide sodium salt in 30 ml. of distilled dimethyl acetamide. The mixture is then stirred for 3 hours at room temperature, then cooled to 0° and acidified to about pH 4 with hydrochloric acid. The greasy precipitate is separated and dissolved in hot ethanol. On cooling, the 4-chloro-6-methoxy-2-sulfanilamido-pyrimidine (see Example 1) is obtained which is recrystallized from ethanol and dried; melting point 163–165°.

*Example 4*

(a) 22.4 g. of nitrobenzene sulfonamide sodium salt are added in portions while stirring to 80 ml. of dimethyl formamide, and a solution of 8.95 g. of 2,4-dichloro-6-methoxy-pyrimidine in 20 ml. of dimethyl formamide is added. The suspension obtained is stirred overnight at a bath temperature of 60–70°. The solvent is then distilled off under high vacuum and the residue is dissolved in 100 ml. of water. After a few minutes, a precipitate of excess p-nitrobenzene sulfonamide is formed. This is filtered off and the filtrate is acidified to pH 2–3, whereupon 4-chloro-6-methoxy-2-(p-nitrobenzene-sulfonamido) pyrimidine precipitates. After crystallization from isopropanol/water, the compound melts at 191–194°.

(b) 0.344 g. of the nitro compound obtained according to (a) are dissolved in 50 ml. of distilled ethanol and the solution is hydrogenated at 25° under normal pressure in the presence of 0.5 g. of Raney nickel. The catalyst is filtered off and the filtrate is evaporated to dryness. The residue is dissolved in cold 2 N hydrochloric acid, the acid solution is washed with ether and the pH is adjusted to 4–5. The precipitate formed is recrystallized from ethanol whereupon 4-chloro-6-methoxy-2-sulfanilamido-pyrimidine (see Example 1) is obtained.

*Example 5*

(a) A suspension consisting of 23.6 g. of $N^4$-acetyl-sulfanilamide sodium salt and 8.95 g. of 2,4-dichloro-6-methoxy-pyrimidine in 100 ml. of dimethyl formamide is stirred for 18 hours at 60–70°. The dimethyl formamide is distilled off in vacuo, the residue is dissolved in about 100 ml. of water and the pH of the aqueous solution is adjusted to 8 with Dry Ice. Excess $N^4$-acetyl-sulfanilamide is filtered off under suction and the pH of the filtrate is adjusted to 3 with hydrochloric acid. The resulting precipitate, which is at first greasy, crystallizes after a short time and, after recrystallization from ethanol, melts at 240–241°.

(b) 0.357 g. of the 2-($N^4$-acetyl-sulfanilamide)-4-chloro-6-methoxy-pyrimidine so obtained are refluxed for 1 hour in 5 ml. of methanol and 0.5 ml. of concentrated hydrochloric acid. A clear solution is formed which is evaporated to dryness in vacuo. The residue is dissolved in water and the pH of the aqueous solution is adjusted to 4–5 with concentrated sodium carbonate solution. The 4-chloro-6-methoxy-2-sulfanilamido-pyrimidine (see Example 1), precipitates in crystalline form and is recrystallized from ethanol.

*Example 6*

1.6 g. of 2-amino-4-chloro-6-methoxy-pyrimidine are suspended in 5 ml. of ice cold anhydrous pyridine. While stirring and cooling, 2.4 g. of $N^4$-acetyl-sulfanilyl chloride are added in portions and the mixture is stirred for 14 hours as room temperature. The pyridine is then distilled off under reduced pressure, 10 ml. of water are added to the residue and the mixture is filtered whereupon 1.6 g. of crude 2-($N^4$-acetyl-sulfanilamido)-4-chloro-6-methoxy-pyrimidine are obtained. This product is mixed with 30 ml. of 1-normal sodium carbonate solution. After stirring for half an hour, undissolved particles are filtered off, the pH of the filtrate is adjusted to 4–5 with 2-normal hydrochloric acid and it is then cooled. The crystals which precipitate are filtered off under suction and recrystallized from ethanol. The pure 2-($N^4$-acetyl - sulfanilamido) - 4 - chloro - 5-methoxy-pyrimidine melts at 240–241° (identical with the product described in Example 5a).

The N-acetyl compound is converted into the 4-chloro-6-methoxy-2-sulfanilamido-pyrimidine as described in Example 5b).

To produce dosage units for peroral application, the active substance of Formula I or a pharmaceutically acceptable salt thereof are combined with a pharmaceutically acceptable adjuvant compatible therewith, e.g. with solid, pulverulent carriers such as lactose, saccharose, sorbitol, mannite; starches such as potato starch, corn starch or amylopectin, also laminaria powder or citrus pulp powder; cellulose derivatives or gelatine, also lubricants such as magnesium or calcium stearate or polyethylene glycols (Carbowaxes) of suitable weights may be added, to form tablets or dragée centres. The latter are coated, for example, with concentrated sugar solutions which, e.g. can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other closed capsules consist for example of a mixture of gelatine and glycerine and contain, e.g. mixtures of the active substance or a suitable salt thereof with Carbowax, and hard gelatine capsules contain, for example, granulates of the active substance or a suitable salt thereof with solid, pulverulent carriers such as, e.g. lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance or a suitable salt thereof with a neutral fatty base, or also gelatine rectal capsules can be employed which consist of a combination of the active substance or a suitable salt thereof with polyethylene glycols (Carbowaxes) of suitable molecular weight.

Ampoules for parenteral application preferably contain a water soluble salt of the active substance of Formula I and, optionally buffer substances in aqueous solution.

The content of the active substance according to the invention in the compositions according to the invention is preferably between about 50 mg. and about 600 mg. per tablet, or capsule or suppository or ampoule. This amount of active substance may constitute a major or a minor portion of the composition.

The following non-limitative example illustrates the production of typical forms of application for oral use and parenteral use.

*Example 7*

Tablets containing 500 mg. of active substance of Formula I (R=$CH_3$).

To produce 100,000 tablets each containing 500 mg. of 4 - chloro - 6-methoxy-2-sulfanilamido-pyrimidine, the following are used:

A

| | Kg. |
|---|---|
| 4-chloro-6-methoxy-2-sulfanilamido-pyrimidine | 50,000 |
| Potato starch, dried | 2,000 |

B

| | |
|---|---|
| Stearic acid pure | 1,200 |
| Ethanol pure ca. 4 liter. | |

C

| | |
|---|---|
| Gelatine | 1,200 |
| Water, distilled ca. 16 liter. | |

D

| | |
|---|---|
| Potato starch, dried | 4,000 |
| Talcum | 1,200 |
| Sodium carboxy methyl cellulose | 400 |
| | 60,000 |

The mixture A is wetted with the stearic acid solution B and mixed for 5 minutes. The gelatine solution C is then added to the mass and mixed for about 10 minutes. As soon as the mass is wetted evenly, it is granulated through a sieve (25 mesh/1 cm.$^2$) and then dried. The dried granulate is again sieved (60 mesh/1 cm.$^2$) and subsequently mixed with the substances listed under D. After 1 hour of mixing, the mass so obtained is then pressed into tablets, each weighing 600 mg. and each containing 500 mg. of the active substance.

I claim:
1. A compound of the formula

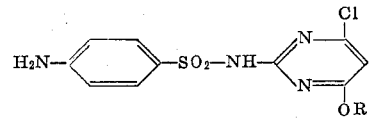

wherein R is alkyl of from 1 to 3 carbon atoms.
2. 4-chloro-6-methoxy-2-sulfanilamido-pyrimidine.
3. 4-chloro-6-ethoxy-2-sulfanilamido-pyrimidine.
4. 4-chloro-6-isopropoxy-2-sulfanilamido-pyrimidine.

References Cited by the Examiner

UNITED STATES PATENTS 2,494,524   1/1950   Sprague _____ 260—239.75 X

OTHER REFERENCES

Backer et al.: Rec. Trav. Chim., vol. 61, pp. 291 to 298 (1942).
Chemical Abstracts, vol. 46, column 9986 (1952).
Chemical Abstracts, vol. 62, column 6492 (1965).
Chemical Abstracts, vol. 62, columns 7775 to 7776 (1965).
Little et al.: J. Immunology, vol. 60, pp. 295 to 298 (1948).
Northey: The Sulfonamides and Allied Compounds, pp. 78 to 79, Reinhold Pub. Corp., New York (1948).
Roblin et al.: J. Am. Chem. Soc., vol. 64, pp. 567 to 570 (1942).

JOHN D. RANDOLPH, *Primary Examiner.*